June 11, 1940.  M. L. LOCKRIDGE  2,204,278
FISHHOOK
Filed Sept. 30, 1938

INVENTOR
M. L. Lockridge
BY
ATTORNEY

Patented June 11, 1940

2,204,278

UNITED STATES PATENT OFFICE 2,204,278

FISHHOOK

Morgan L. Lockridge, Knights Landing, Calif.

Application September 30, 1938, Serial No. 232,545

2 Claims. (Cl. 43—36)

This invention relates in general to an article of fishing tackle for sportsmen, and the invention is particularly directed to an improved multiple hook device which may be used either as a fly hook or a bait hook.

The principal object of the invention is to provide a multiple hook device including a pair of opposed outwardly facing hooks, the device being arranged so that the hooks may be overlapped and so set whereby when a fish strikes the hooks, the force of the strike automatically causes the hooks to expand or spring apart, thereby firmly setting the same in the mouth of the fish.

Another object of the invention is to provide a multiple hook device which when in set position, as above, is substantially snag-proof, and does not tend to catch on weeds, submerged limbs, etc.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 2:
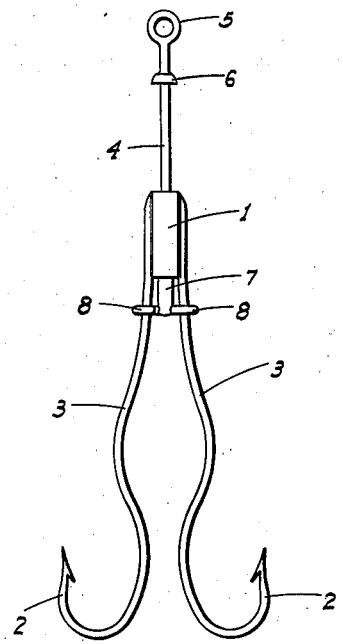
Figure 2 is an enlarged side elevation of the device illustrating the position of the parts after a fish has struck and the hooks have sprung apart.
Figure 4:
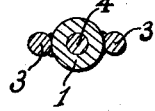
Figure 4 is an enlarged fragmentary section on line 4—4 of Fig. 1.
Figure 3:
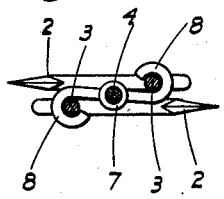
Figure 3 is an enlarged cross section taken on line 3—3 of Fig. 1.

Referring now more particularly to the characters of reference on the drawing, my improved multiple hook device comprises a relatively small tubular sleeve 1. Opposed outwardly facing hooks 2 are disposed below the sleeve and are provided with relatively long and resilient shanks 3 which are secured lengthwise at their upper ends on the sleeve 1 on opposite sides thereof; said shanks initially diverging from their upper ends to a point substantially centrally of their ends, and thence converging slightly or rounding into the hooks, as clearly shown in Fig. 2.

A small rod 4 extends through the bore in sleeve 1 and at its upper end is provided with an eye 5 adapted to be connected with the leader or line. A stop collar 6 is formed on the rod immediately below eye 5 and limits movement of said rod through the sleeve 1 in a downward direction.

The lower end of rod 4 is provided with a relatively small fixed head 7; there being loops 8 formed on and projecting radially from said head in opposed directions. These loops 8 surround the hook shanks 3 in easy slidable relation thereto.

Figure 1:
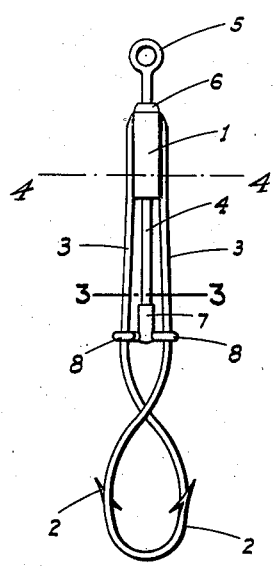
Figure 1 is an enlarged side elevation of the device in set position.

To set the hook, the rod 4 is moved downward through sleeve 1, forcing loops 8 downward on diverging shanks 3. This moves the diverging shanks 3 inward in the manner illustrated in Fig. 1, and as hooks 2 and the adjacent portions of the shanks are offset somewhat, the hooks are moved into an overlapping position, the convergence of the lower portion of the shanks being designed to this end. The device is thus set and ready for use; the friction between loops 8 and shanks 3 holding the loops against accidental movement up said shanks. When a fish strikes the overlapped hooks, the force of the strike pulls the hooks, shanks, and connecting sleeve 1 in a direction downward or away from eye 5, resulting in loops 8 rapidly sliding upward along the shanks 3 in the direction of sleeve 1. When this occurs, the shanks 2 snap or spring apart and the hooks are firmly set in the mouth of the striking fish.

When the device is used with bait, the bait is fixed on each hook separately so as not to restrict springing apart of the hooks. When the device is used as a fly hook, the hackles, etc., are tied to the sleeve 1, which is of sufficient length for this purpose.

The multiple hook device, as described above, is also substantially weed-proof or snag-proof, due to the fact that when the device is set, the hooks are in overlapping position and the barbs are not exposed sufficiently to catch on weeds, snags or the like.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A multiple fishhook device comprising a pair of outwardly facing hooks including elongated resilient shanks, a sleeve disposed between the upper end portions of the shanks, said upper end portions of the shanks being fixed on opposite sides of the sleeve end longitudinally thereof, said shanks initially diverging from the inner end of the sleeve, a rod slidably extending through said sleeve, an eye on the upper end of the rod, a head fixed on the lower end of the rod, said head being adapted to engage the lower end of the sleeve and limit upward movement of the rod relative thereto, and a pair of loops formed rigid with said head and projecting in radially opposite directions and surrounding the shanks in slidable relation thereto; said loops being spaced apart from center to center substantially the same distance as the distance between the longitudinal axes of the shanks at the sleeve whereby upon movement of the loops down the shanks in a direction away from said sleeve, said shanks are sprung inward and releasably held in such position until relative approaching movement occurs between the loops and sleeve.

2. A multiple fishhook device comprising a pair of outwardly facing hooks including elongated resilient shanks, a sleeve disposed between the upper end portions of the shanks, the sleeve being relatively long and said upper end portions of the shanks being fixed on opposite sides of the sleeve and longitudinally thereof, said shanks initially diverging from the inner end of the sleeve, a rod slidably extending through said sleeve, an eye on the upper end of the rod, and opposed loops projecting from the lower end of the rod and surrounding the shanks in slidable relation thereto; said loops being spaced apart from center to center substantially the same distance as the distance between the longitudinal axes of the shanks at the sleeve whereby upon movement of the loops down the shanks in a direction away from said sleeve, said shanks are sprung inward and releasably held in such position until relative approaching movement occurs between the loops and sleeve.

MORGAN L. LOCKRIDGE.